June 4, 1963  J. W. WAGNER  3,092,024
CHECK CERTIFYING APPARATUS
Filed Dec. 18, 1961
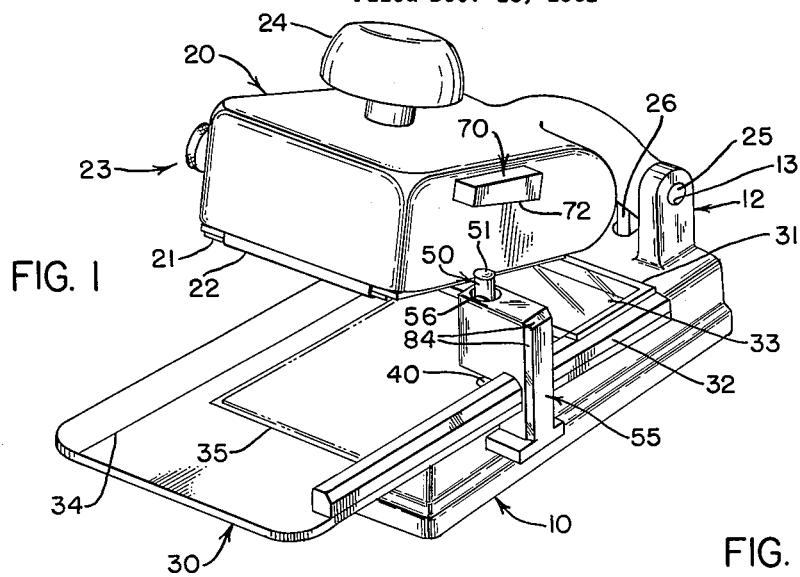
FIG. 1
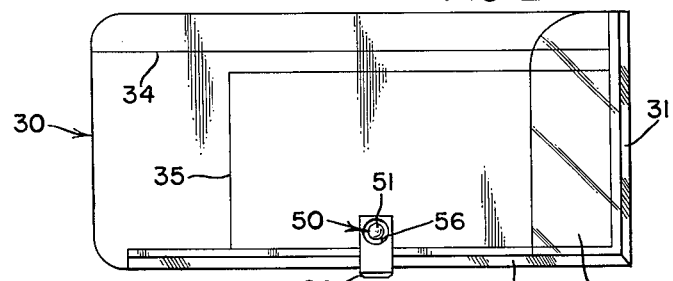
FIG. 2
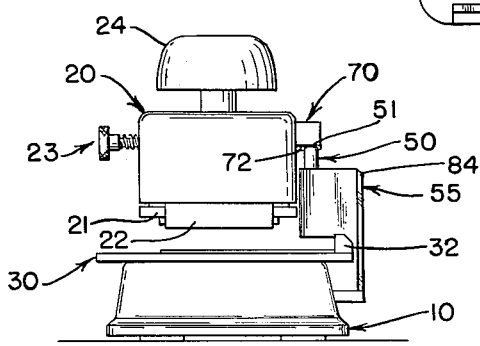
FIG. 3
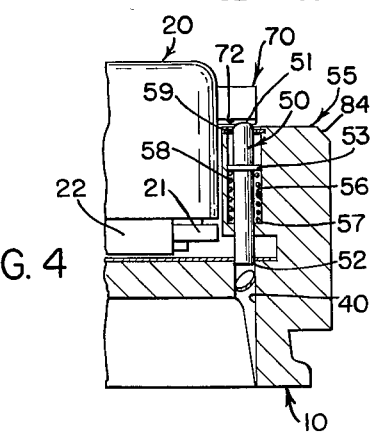
FIG. 4
FIG. 5
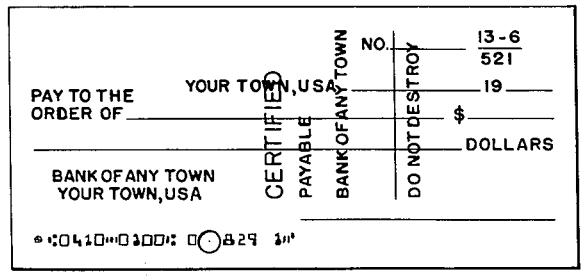
*INVENTOR.*
JOHN W. WAGNER
BY
*Fay & Fay*
ATTORNEYS United States Patent Office 3,092,024
Patented June 4, 1963

3,092,024
CHECK CERTIFYING APPARATUS
John W. Wagner, Cleveland, Ohio, assignor to Whitaker Brothers & Company, Lakewood, Ohio, a partnership
Filed Dec. 18, 1961, Ser. No. 160,034
3 Claims. (Cl. 101—297)

This invention relates to a method and apparatus for stamping and perforating certified checks of the type pre-encoded for electronic processing with magnetic ink character recognition numbers.

The apparatus comprises a novel combination of co-operative means for severing a portion of the magnetic code indicia of a pre-encoded check to cause its automatic segregation from electronic processing apparatus for special handling and then marking the face of the check to provide a visual indication of its special nature. An apparatus constructed according to the principles of this invention provides a sequence of operation which makes it impossible to certify a magnetically encoded check without first providing for its automatic segregation from the electronic processing equipment.

In its broadest aspects the method and apparatus of this invention provides for orienting a magnetically encoded check for precise perforating and marking, rotating a pivotally mounted arm having a cam surface and certifying stamp thereon toward the oriented check, and reciprocating a check perforator by engagement of the cam surface with the perforator to remove a portion of the magnetic indicia from the check just prior to marking the check face with the certifying stamp.

In converting to magnetic ink automation processing, it has become necessary for banks to make special provision for processing certified checks. A certified check is one stamped by a bank at the request of the drawer to indicate that the bank guarantees payment and has set aside and reserved from the account upon which the check is drawn, the amount of the check. In effect, then, the bank withdraws the amount from the account and holds it for payment of the check.

In handling checks by electronic processing equipment, the checks are placed in an apparatus and the information encoded in magnetic ink is read electronically at the rate of hundreds of checks per minute. The individual checks are then sorted by account, posted, and filed. At the end of each month, the electronic apparatus totals the debits and credits to the account and feeds the information to a printing device which prints the account statements. Although this equipment is faster and more accurate than hand sorting and posting, it is less flexible in operation. Accordingly, provision must be made for preventing the automatic deduction of the paid certified checks from the account on which they were drawn in the manner that paid checks ordinarily are deducted, since this deduction already has been made by the bank at the time of certifying.

The present standard procedure for avoiding a second deduction from the account during automatic handling of magnetically encoded certified checks is to have a bank clerk stamp the word "certified" across the face of the check being certified and then hand punch to sever physically from the magnetically encoded check that portion of the magnetic ink character recognition numbers which would result in the deduction of the amount of the check from the account during electronic processing. In the absence of this portion of the magnetic ink character recognition numbers, the check will be segregated from the normal run of checks automatically so that it may be sorted manually and posted without erroneous duplication of the account deduction.

The novel apparatus and method, according to the principles of this invention, provide an improved and convenient method of performing this basic certifying procedure on magnetically encoded checks and a novel apparatus for facilitating that method. The need for the improvements provided by this invention is occasioned by the fact that often the bank clerk certifying the check will stamp the check "certified" but forget to sever from the check a portion of the magnetic ink character recognition numbers, or by the fact that if the clerk does sever a portion of the check it is done at a location on the check which will not effect segregation of the certified check from the electronic processing equipment. The errors resulting from the failure of bank clerks to certify checks properly may result in extreme expense and inconvenience to the bank and its customers and accordingly the chance of such an error occurring must be minimized.

With the foregoing problem in mind, it is a general object of the invention to provide an improved method and apparatus for handling certified checks accurately in automatic check processing systems.

It is a more specific object of the invention to provide a novel method and apparatus for sequentially severing and depositing ink on a check having magnetic ink character recognition numbers thereon.

It is a still further object of the invention to provide a sequentially operating magnetically encoded check severing and ink depositing method and device whereby a check having standard ink character recognition numbers printed thereon adjacent the straight side thereof may be positioned on a flat surface in such a manner that a predetermined portion of the magnetic ink character recognition numbers will first be severed from the check, and subsequently ink from a certifying stamp will be deposited on the check.

Other and more specific objects of the invention will become apparent from the detailed description to follow.

In the drawings:

FIG. 1 is a perspective view of a sequentially operating check severing and marking device constructed according to the principles of this invention.

FIG. 2 is a plan view of the check engaging portions of the base member.

FIG. 3 is an end elevation view of the device illustrated in FIG. 1.

FIG. 4 is a fragmentary cross-sectional view schematically illustrating certain parts in full for clarity.

FIG. 5 is a view of a magnetically encoded check certified by the method and apparatus of this invention.

In the following description of the several views of the drawings, like parts are indicated by like numerals throughout.

FIG. 1 illustrates a check certifying device having a base portion 10 and an arm 20 pivotally secured thereto. Mounted on the base 10 is a platform or flat surface area 30 which acts as a locater, striking pad, and severing die for a magnetically encoded check to be certified. An aperture 40 is disposed perpendicularly in the platform 30 at a location such that a reciprocating member 50 slidably held intermediate its ends by supporting structure 55 in spaced register with the aperture, cooperates with the aperture to perform the punching or severing operation on the portion of the magnetic ink character recognition numbers to be severed from the check.

Precise locating of the check in the device is accomplished manually by inserting the check on the flat surface area 30 between the aperture 40 and the reciprocating member 50 against an end curb 31 and a side curb 32 perpendicularly disposed about the edge of the platform 30. A transparent plastic cover 33 is spaced slightly from the platform 30 to bridge a portion of the area between the curbs 31 and 32 and form an accurate check holding pocket.

A certification stamp 21 is disposed on the pivoted arm 20 with an ink impregnated ribbon 22 over the face thereof, such that when the arm 20 is pivoted toward a check located in position on the platform 30, the platform acts as a striking pad for the stamp 21 and the certification mark thereby is printed through the inked ribbon 22 onto the face of the check. The arm 20 is pivotally mounted on the end of the base member 10 in bearing lugs 12 which project upwardly from the base at a location such that a bumper block or camming member 25 on the arm 20 is in alignment with the exposed convex end 51 of the reciprocating member 50. The end 51 is engaged by the lower surface 72 of the camming means 70 as the arm pivots toward the check in an arc defining a plane parallel to the member 50 to create a perpendicular reciprocating movement of the member 50 through support 55 into the aperture 40. The aperture 40 and the opposed end 52 of the reciprocating member are of complementary shape and dimension such that the end 52 of the member 50 is received in the aperture 40 in shearing engagement so as to sever the desired portion of the magnetic ink character recognition numbers on the check.

The supporting structure 55 is of a shape which permits it to be mounted on the base 10 below the platform 30 and to overhang the platform 30 in the area of the aperture 40 adjacent the path of the arm 20. The reciprocating member 50 is mounted in a bore 56 of the supporting structure 55 which is counterbored as at 57 to receive a resilient coil spring 58 in abutting relation with a flange 53 on the member 50. A suitable split retaining ring 59 is seated in a groove in the supporting structure 55 to prevent movement of the reciprocating member 50 out of the bore. The spring 58 abutting the flange 53 on the member 50 normally urges the reciprocating member 50 in spaced relation in register over the aperture 40, such that in order for the certification stamp 21 to engage a check positioned on platform 30, the bumper block or cam means first must act against the force of the spring 58 to advance the reciprocating member into shearing engagement with the edge of the aperture 40.

It is important to the invention that the reciprocating member 50 and the aperture 40 be perpendicularly disposed to the flat surface area of the platform 30 so that a clean edge severing of the portion of the magnetic ink character recognition number desired to be removed occurs and that no upturned edge which might foul the electronic processing equipment be left after the severing operation.

The certification stamping character 21 and the ink impregnated ribbon 22 thereover are of the conventional type found in stamping machines and includes a means, such as illustrated generally at 23, for pulling the used ribbon into a cavity in the arm (not shown) to provide a fresh ribbon. A handle 24 such as the one illustrated is provided on the top of the arm to facilitate manual engagement of the arm and pivoting actuation thereof. The pivotal connection between the arm 20 and the base 10 may take various forms but as illustrated includes projecting lugs 12 on the base portion adjacent the end of the flat surface area or platform 30 having apertures 13 for receiving a journal shaft or lugs 25 on the arm 20. A cam or arm means 26 may be spring actuated or otherwise provided in conventional form to engage and hold the arm in normally open position for ready receipt of a check on the platform 30 between the arm 20 and the base 10.

The check certifying or severing and ink depositing device constructed according to the principles of the invention operates sequentially so that the severing of the desired portion of the magnetic ink character recognition numbers is accomplished immediately prior to the engagement of the check with the inked raised characters of the certifying stamp. This is a safety provision to insure that the check may not be stamped "certified" without the severing first being accomplished. This sequential operation of the device is insured by the relative dimension of the operating parts as illustrated in FIGS. 3 and 4.

As will be seen in the drawings, the reciprocating member 50 has an overall length slightly greater than the distance from the top of the support means 55 to the aperture 40. The bumper block or camming means 70 thus must engage the end 51 and advance the end 52 of the reciprocating member 50 into the aperture 40 before the ink ribbon 22 engages the check. The end 51 of the reciprocating member 50 which engages the upper block or camming means 70 is rounded such that the rotational arc movement of the member 70 creates a sliding tangential engagement of the surface 72 with the member 50 creating a reciprocation perpendicular to the platform 30 with a minimum of binding and frictional resistance. It has been found that the frictional resistance between the surface 72 and end 51 can be reduced further by providing the engaging surface 72 of the bumper block or camming means 70 with a slight taper throughout its length.

The electronic equipment for processing standard magnetically encoded checks requires that the checks be positioned accurately in the apparatus and accordingly the end of these checks to the right of the signature line and the adjacent side of the checks below the signature line are accurately cut in perpendicular relation to one another when the checks are encoded. The provision of the curb means 31 and 32 on the platform 30 permits precise positioning of these standard magnetically encoded checks in the apparatus of this invention because of the provision of these accurately disposed reference edges.

As will be seen in FIG. 5, the magnetic ink character recognition numbers are disposed below the signature line at a predetermined distance therefrom. In order to assure location of the hole in the proper location on a check, the aperture 40 is spaced from the curb means 32 by this same distance and since each of the encoded numbers on the check is spaced a predetermined distance from the reference end of the check previously referred to, the aperture 40 is placed an equal predetermined distance from the curb means 31, thus assuring that the proper portion of the magnetic ink character recognition number is removed during the operation of the device.

The alignment of the magnetically encoded check to be certified is facilitated by the use of the lines 34 and 35 on the platform 30. Of course, the provision of these alignment guides is optional and the lines are of value only when standard sized checks are being certified in the apparatus.

FIG. 5 is an illustration of a standard magnetic ink encoded check which has been severed and stamped "certified" in the apparatus of this invention. As will be seen, the portion of the magnetic ink character recognition number removed is accurately registered with the magnetic ink character recognition numbers and the certification ink stamp is clearly visible across the face of the check. It will be obvious from the foregoing description that the position of the aperture 40 and the reciprocating member 50 is different for each of the individual banks using the device so that the certifying device of one bank will not be capable of use on encoded checks of another bank. This provision has obvious merits as a prevention of fraudulent use of the certification device.

In constructing the device according to the principles of this invention, the corners and edges of the various parts as illustrated at 84 on the support member 55, for instance, have been beveled and rounded to prevent injury to the operator. Such modifications, however, are merely illustrative of a preferred embodiment of the invention.

For ease of description, the principles of the invention have been set forth with but a single illustrated embodiment showing one form of check certifying or sequentially operating check severing and ink depositing device. It is not my intention that the illustrated embodiment nor the terminology employed in describing it be limiting inasmuch as variations of these may be made without departing from the spirit of the invention. Rather I desired to be restricted only by the scope of the appended claims.

The invention claimed is:

1. A sequentially operating check severing and ink depositing device comprising base means having on a portion thereof a flat surface area defined on both one and on an adjacent side by precisely disposed perpendicularly oriented curb means, said flat surface area having a perependicularly disposed aperture therein of a predetermined size and space a first predetermined distance from said one end and a second predetermined distance from said adjacent side, bearing means disposed on said base means adjacent said one end of said flat surface area, support means projecting from said base means and spaced over said aperture, said support means having slidably mounted in a bore thereof for reciprocation in a path perpendicular to said flat surface area a member which has a first end in register with said aperture, said first end having a shape complementary to the shape of said aperture and a size slightly smaller than the size thereof, said member having a convex end opposite said first end and an overall length slightly greater than the distance from the top of the support means to said aperture, resilient means biasing said convex end away from the support means bore and said first end toward said support means bore to provide a clearance between said first end and said aperture, arm means carrying inked raised characters normally spaced from said flat surface area, said arm means pivotally mounted in said bearing means for movement toward said area in a path defined by an arc lying in a plane perpendicular to said flat surface area and aparallel to the path of reciprocation of said slidably mounted member into a position of engagement of said characters with said flat surface area, camming means on said arm means in alignment with the convex end of said slidably mounted member for sliding tangential engagement therewith during pivot movement of said arm means toward said flat surface area, the distance between said camming surface and said characters being such that said camming surface advances the first end of said reciprocating member into said aperture immediately prior to engagement of said characters with said flat surface area, whereby a check having standard magnetic ink character recognition numbers printed thereon adjacent a straight side edge thereof may be positioned on said flat surface area with an end abutting said end curb means and said straight side edge engaging said adjacent side curb means with a predetermined portion of said standard magnetic ink character recognition numbers in register with said aperture, and said pivoted arm means may be moved into engagement with said check in such a manner that said predetermined portion of said magnetic ink character recognition numbers will be first severed from said check and subsequently ink from said characters will be deposited on said check.

2. The device of claim 1 in which said inked raised characters include a check certifying stamp covered by an ink impregnated ribbon.

3. The device of claim 1 in which said inked raised characters engage only a limited portion of said flat surface area, and a different portion of said flat surface area is in register with a transparent covering member disposed on spaced parallel relation thereto.

References Cited in the file of this patent

UNITED STATES PATENTS

| | | |
|---|---|---|
| 63,017 | Chamberlain | Mar. 19, 1867 |
| 410,970 | Hill | Sept. 10, 1899 |
| 1,209,413 | Duncan | Dec. 19, 1916 |
| 1,556,089 | Ecke | Oct. 6, 1925 |

FOREIGN PATENTS

| | | |
|---|---|---|
| 254,293 | Italy | Nov. 12, 1926 |